March 7, 1950  J. F. ECKEL ET AL  2,499,853
CABLE MANUFACTURING APPARATUS
Original Filed April 25, 1944  2 Sheets-Sheet 1
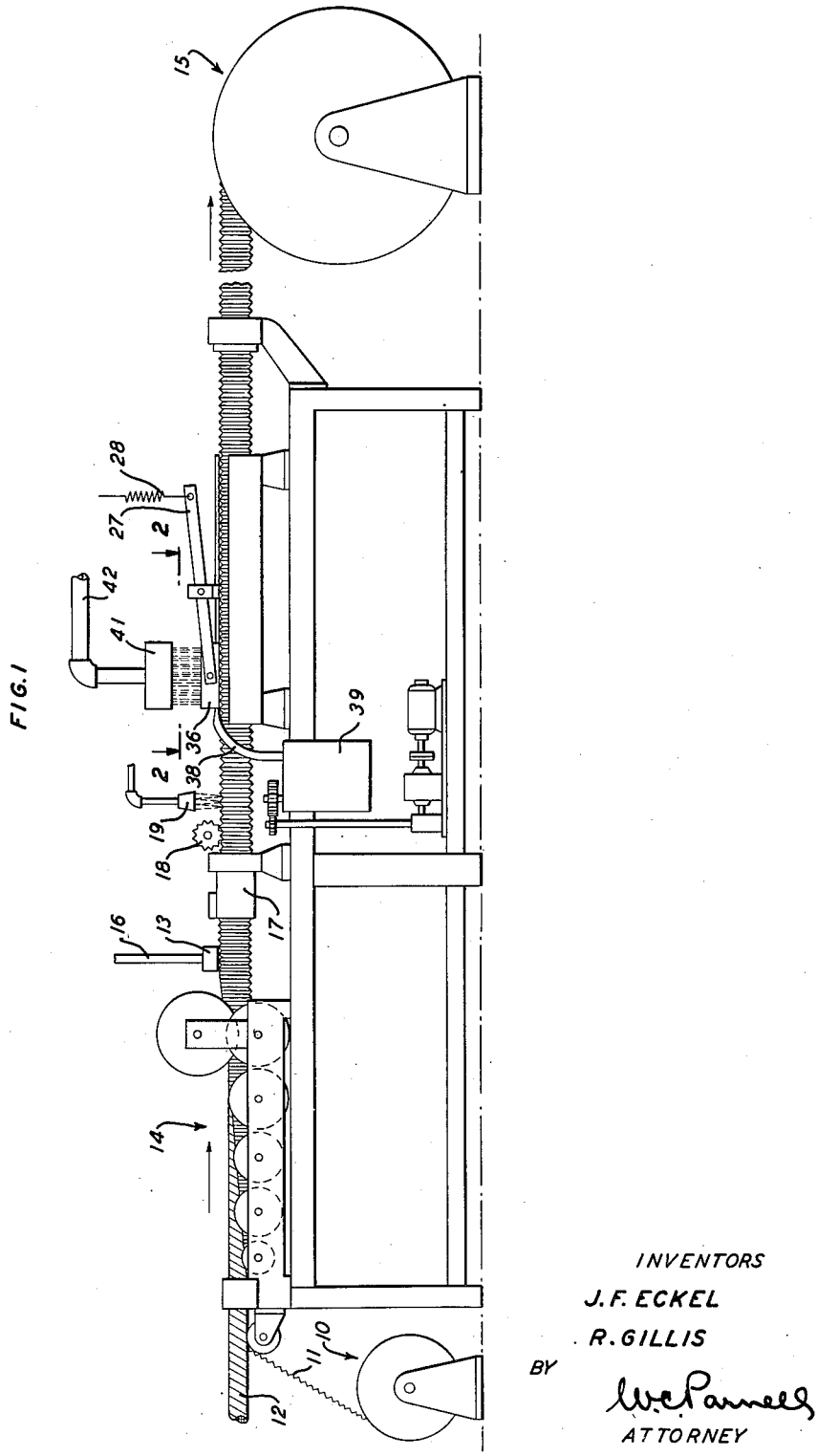
INVENTORS
J. F. ECKEL
R. GILLIS
BY
W. C. Parnell
ATTORNEY

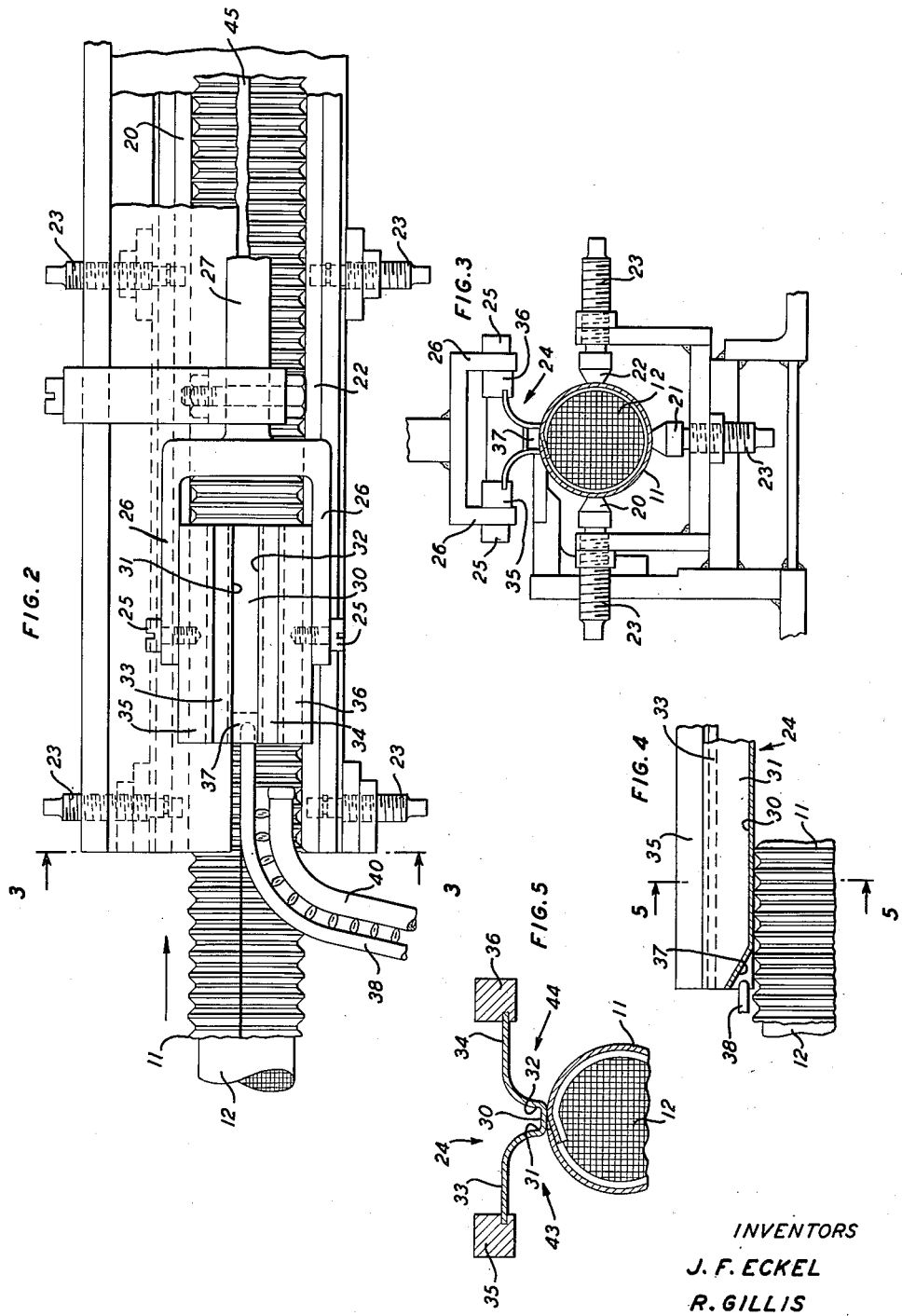

Patented Mar. 7, 1950

2,499,853

UNITED STATES PATENT OFFICE 2,499,853

CABLE MANUFACTURING APPARATUS

John F. Eckel, Schenectady, and Randall Gillis, Snyder, N. Y., assignors to Western Electric Company, Incorporated, New York, N. Y., a corporation of New York Continuation of application Serial No. 532,612, April 25, 1944. This application December 22, 1947, Serial No. 793,174

2 Claims. (Cl. 113—59)

This invention relates to cable manufacturing apparatus, and more particularly to apparatus for making electrical conductor cable having over the core of the cable a sheath of metal formed from a transversely corrugated thin tape of metal folded along the length thereof about the core and soldered along the abutted or overlapped edges of the tape.

Multi-conductor electrical cable is, in some instances, made with a protective sheath over the core of the cable consisting of a transversely corrugated, thin tape of metal, e. g., brass or copper, which is folded along its length about the core of the cable and has its usually overlapped edges soldered continuously along the same so formed to provide a water-tight and gas-tight sheath. Up to the present time the principal difficulty arising in machines for manufacturing such cable has been in connection with means to effect the continuous soldering of the indefinitely long seam with suitable speed while ensuring that the soldering of the seam shall be continuously flawless.

An object of the present invention is to provide, in an apparatus of the general character described, soldering means effective to close and seal a continuous seam between overlapped sheet metal edges both rapidly and unbrokenly flawlessly.

With the above and other objects in view, the invention may be embodied, in an apparatus having means to advance a continuous seam between overlapped thin metal edge portions and means to present solder continuously to such seam, in a soldering device to press against the seam and the solder thereon and heat the same while soldering union is effected, the said soldering device comprising a shoe formed of thin metal and having a substantially flat, thin sheet metal sole portion to rest flatwise on the seam and upwardly directed wing portions together with means to heat the shoe by directing a flame into the trough formed by the sole and wings.

Other objects and features of the invention will appear from the following detailed description of one embodiment thereof taken in connection with the accompanying drawings, in which the same reference numerals are applied to identical parts in the several figures and in which Fig. 1 is a view in side elevation of an apparatus constructed in accordance with the invention;

Fig. 2 is an enlarged view of the line 2—2 of Fig. 1;

Fig. 3 is a view on the line 3—3 of Fig. 2;

Fig. 4 is a vertical detail section longitudinally through the nose of the soldering shoe with the solder supply tube removed; and Fig. 5 is a view on the line 5—5 of Fig. 4.

The apparatus disclosed in Fig. 1 comprises means generally indicated at 10 to supply a transversely corrugated, otherwise flat tape 11 to be applied under and against a cable core 12 coming from some supply means (not shown) at the left. The tape is folded about the core by means, diagrammatically shown and generally indicated at 14, as a cylindrical sheath with overlapped but unconnected edges. At the extreme right the completed cable is advanced through the machine and wound up on some suitable means, e. g., a takeup reel or capstan as generally indicated at 15, driven by motor means (not shown). The units 10, 14, and 15 form no part of the invention, either as to structure or mode of operation, and so are neither shown nor described in detail. However, it may be noted that suitable apparatus 14 for folding the tape about the core is illustrated and described in detail in U. S. Patent 2,156,952 of May 2, 1939, to William Morsing, to which reference may be had, if desired, in this connection. After emerging from the folding means 14, the tape-wrapped core passes under a device to supply a fluxing solution to the overlapped tape edges which lie along the upper side. This flux device also forms no part of the present invention, but, for illustration here, may be thought of as a box 13 having a porous bottom resting on the open seam of the tape together with a pipe 16 to conduct fluxing fluid to the box from some supply (not shown). A die 17 then compacts the tape a little more closely about the core, while a suitably toothed, freely rotating wheel or gear 18, just back of the die, ensures the proper intermeshing of the two corrugated edges of the tape. The wheel 18 is followed by a preheating means comprising a burner 19 from which a flame is directed downwards upon the closed seam in the tape sheath. Thence the sheathed core with the fluxed and closed but not yet sealed seam in the sheath passes to the soldering unit which embodies the present invention.

The cable forming apparatus generally, and as to other features herein disclosed, is the subject of copending application Serial No. 532,613 filed of even date with the parent application hereof by one of the present inventors, said copending application now being Patent No. 2,459,877, issued January 25, 1949; and the method generally of forming the sheathed cable and the cable itself generally as herein disclosed are the subject matter of copending application Serial No. 532,614, now Patent No. 2,479,924, issued August 23, 1949, and also filed of even date with the parent application by one of the present inventors. The parent application referred to above was filed April 25, 1944, as S. N. 532,612, and is now abandoned.

The soldering unit proper, which is the subject of this application, comprises three elongated guide shoes 20, 21, and 22, parallel to each other and to the axis of the advancing cable and disposed at the left, under and at the right of the same respectively, as seen in Fig. 3. These three shoes are suitably supported in the frame of the apparatus, as shown, to confine the advancing cable during the soldering operation to a definite path and to assist in keeping the seam of the cable sheath closed. Preferably these shoes are carried in the frame on adjustment means such as screws 23, whereby the pressure of the shoes on the cable may be adjusted and also whereby the apparatus may be adapted to various sizes of cable.

A soldering shoe, generally indicated at 24, is pivotably mounted by screws 25 in a yoke 26 formed in one end of a lever 27 mounted in a suitable bracket on the machine frame to be pivotable in a vertical plane passing through the axis of the cable. The yoke 26 being horizontal, the shoe 24 is pivotable in the same plane. A tension spring 28 acting on the other end of the lever 27 from the yoke, keeps the shoe 24 resiliently pressed down on the cable sheath seam. The body of the shoe is an integral sheet of metal as thin as is compatible with the rigidity necessary under the circumstances formed into a trough with an elongated, relatively narrow, flat sole or bottom 30, and upwardly directed sides 31 and 32 flaring widely outwardly from each other into horizontal wings which are gripped in slots in relatively heavy parallel bars 35 and 36 which receive the screws 25 to support the shoe in the yoke 26. At the front end of the shoe the bottom or floor 30 is brought slantingly up, as shown at 37 in Figs. 3 and 4, between its side walls to form a recess to receive the tip of a delivery tube 38 through which molten solder is pumped from a reservoir 39 suitably heated by means not shown, e. g., electric heating units within the reservoir. The tube 38 may also be heated, if necessary, to keep the solder therein molten, e. g., by a multiple jet gas burner 40 shown in Fig. 2 but omitted in the other figures for clarity. Both tubes 38 and 40 are omitted in Fig. 3 to allow the shoe 24 to be seen plainly.

Above the shoe 24 is positioned a burner 41 supplied with fuel from some source (not shown) through a pipe 42 and having a plurality of downwardly directed flame jets aligned and positioned to play on the upper surface of the sole 30 of the shoe 24. The upstanding and flared sides of the shoe shield the parts of the cable not in contact or nearly in contact with the bottom of the shoe from the heat. The large air spaces, indicated at 43 and 44 in Fig. 5, between the wings of the shoe 24 and the cable generally, are kept cool enough by convection currents so that no material amount of heat is delivered to the cable here except through the sole 30 of the shoe; and along this sole, because of the thinness of the metal of the floor, the heat transfer from the flame of the burner 41 through the shoe sole 30 to the solder filled cable seam is rapid and unimpeded. Because of its relatively small mass, the thin metal shoe can be heated to operating temperature in little time and at small waste of fuel, and little time or heat is wasted uselessly when it is cooled.

An apparatus of the kind illustrated generally in Fig. 1 is a big thing, takes up considerable space, and is usually adjoined to some kind of cabling machine from which it receives the core 12. Such installations are generally set up and operated in large hall-like enclosures, where the atmospheric conditions are ordinarily not susceptible of close control and may vary materially with changing weather conditions outside. Thus the temperature of the tape 11, even though preheated at 19, may vary as it comes to the soldering shoe 24 and thus require adjustment of the temperature of the shoe. Were the shoe a massive block, as in many soldering procedures, effecting a change in its temperature would unavoidably take time. And were the shoe a massive block as long as that illustrated at 24, much heat would be required or wasted in raising or lowering its temperature as the case might be, as compared with the case of the almost instantaneous temperature changes effected in the thin metal sole 30 herein described by a change in the fuel supply to the burner 41.

In operation, the seam to be soldered coming from the gear wheel 18 and preheater 19 and under the tip of the solder feed tube 38 opens a trifle vertically, just enough to allow a portion of the molten solder to flow between the overlapped edges of the tape 11 as well as to spread a little both ways laterally of the upper edge, so that the band or stripe 45 of solidified solder extends into as well as over the seam, thus making a continuously sealed joint. The solder is omitted in Figs. 4 and 5 to show the parts involved clearly, but is shown forming the completed joint in Fig. 2.

This application is a continuation of the application Serial No. 532,612, filed April 25, 1944, by the present inventors, and now abandoned.

What is claimed is:

1. An apparatus comprising means for longitudinally advancing a cable sheathed with a metallic strip having a horizontally extending and upwardly facing longitudinal seam, means for applying solder to the moving seam, means to direct a heating flame down upon said seam, a soldering shoe having a flat horizontal sole of thin sheet metal interposed between the flame and the seam, formed with upwardly and outwardly flaring wings upstanding from the lateral edges of the sole, and the front portion of the sole being turned up between the wings to form a recess whose roof is the upwardly turned front portion of the sole and whose side walls are portions of the wings for admission of solder to the seam under the sole.

2. An apparatus comprising means for longitudinally advancing a cable sheathed with a metallic strip having a horizontally extending and upwardly facing longitudinal seam, means for applying solder to the moving seam, means to direct a heating flame down upon said seam, a soldering shoe having a flat horizontal sole of thin sheet metal interposed between the flame and the seam, and formed with upwardly and outwardly flaring wings upstanding from the lateral edges of the sole, and the front portion of the sole being turned up between the wings to form a recess whose roof is the upwardly turned front portion of the sole.

JOHN F. ECKEL.
RANDALL GILLIS.

REFERENCES CITED

The following references are of record in the file of this patent:

UNITED STATES PATENTS

| Number | Name | Date |
|---|---|---|
| 29,039 | Patee | July 3, 1860 |
| 697,785 | Black | Apr. 15, 1902 |
| 1,295,750 | Hibbs | Feb. 25, 1919 |
| 1,571,903 | Rosenblatt | Feb. 2, 1926 |
| 2,156,952 | Morsing | May 2, 1939 |
| 2,352,325 | Hughey | June 27, 1944 |